(12) United States Patent
Schuttenberg

(10) Patent No.: US 9,304,693 B1
(45) Date of Patent: Apr. 5, 2016

(54) SYSTEM AND METHOD FOR WRITING DATA TO A DATA STORAGE STRUCTURE

(71) Applicant: Marvell International Ltd., Hamilton (BM)

(72) Inventor: Kim Schuttenberg, Gilbert, AZ (US)

(73) Assignee: Marvell International Ltd., Hamilton (BM)

( * ) Notice: Subject to any disclaimer, the term of this patent is extended or adjusted under 35 U.S.C. 154(b) by 187 days.

(21) Appl. No.: 14/097,311

(22) Filed: Dec. 5, 2013

Related U.S. Application Data

(60) Provisional application No. 61/738,295, filed on Dec. 17, 2012.

(51) Int. Cl.
*G06F 12/02* (2006.01)
*G06F 3/06* (2006.01)

(52) U.S. Cl.
CPC ............ *G06F 3/0613* (2013.01); *G06F 3/0655* (2013.01); *G06F 3/0673* (2013.01)

(58) Field of Classification Search
CPC ............ G06F 12/0215; G06F 13/1673; G06F 2212/301; G06F 5/16; G06F 13/18; G06F 9/30025; G06F 9/30072; G06F 12/0246; G06F 12/0292; G06F 12/0607; G06F 12/0684; G06F 12/0888; G06F 13/1647; G06F 15/16
See application file for complete search history.

(56) References Cited

U.S. PATENT DOCUMENTS

| 5,594,702 A | * | 1/1997 | Wakeman et al. ....... 365/230.05 |
| 6,779,055 B2 | | 8/2004 | Kim et al. |
| 7,149,139 B1 | | 12/2006 | Rosen |
| 8,285,914 B1 | | 10/2012 | Venkatramani et al. |
| 8,335,878 B2 | | 12/2012 | Lee et al. |
| 2002/0199042 A1 | * | 12/2002 | Kim et al. ....................... 710/51 |
| 2010/0205346 A1 | | 8/2010 | Lundstrum et al. |

* cited by examiner

Primary Examiner — Yong Choe

(57) ABSTRACT

Systems and methods for writing data to a data storage structure are provided. A data storage structure includes an array of storage locations. A plurality of write ports are configured to write a number of elements to the array simultaneously. The array of storage locations is arranged logically into N groups. Each group of the N groups is associated with a single multiplexer of a plurality of multiplexers. The single multiplexer is configured to receive inputs from the plurality of write ports and to select a single input to be written to a storage location of the associated group.

17 Claims, 7 Drawing Sheets

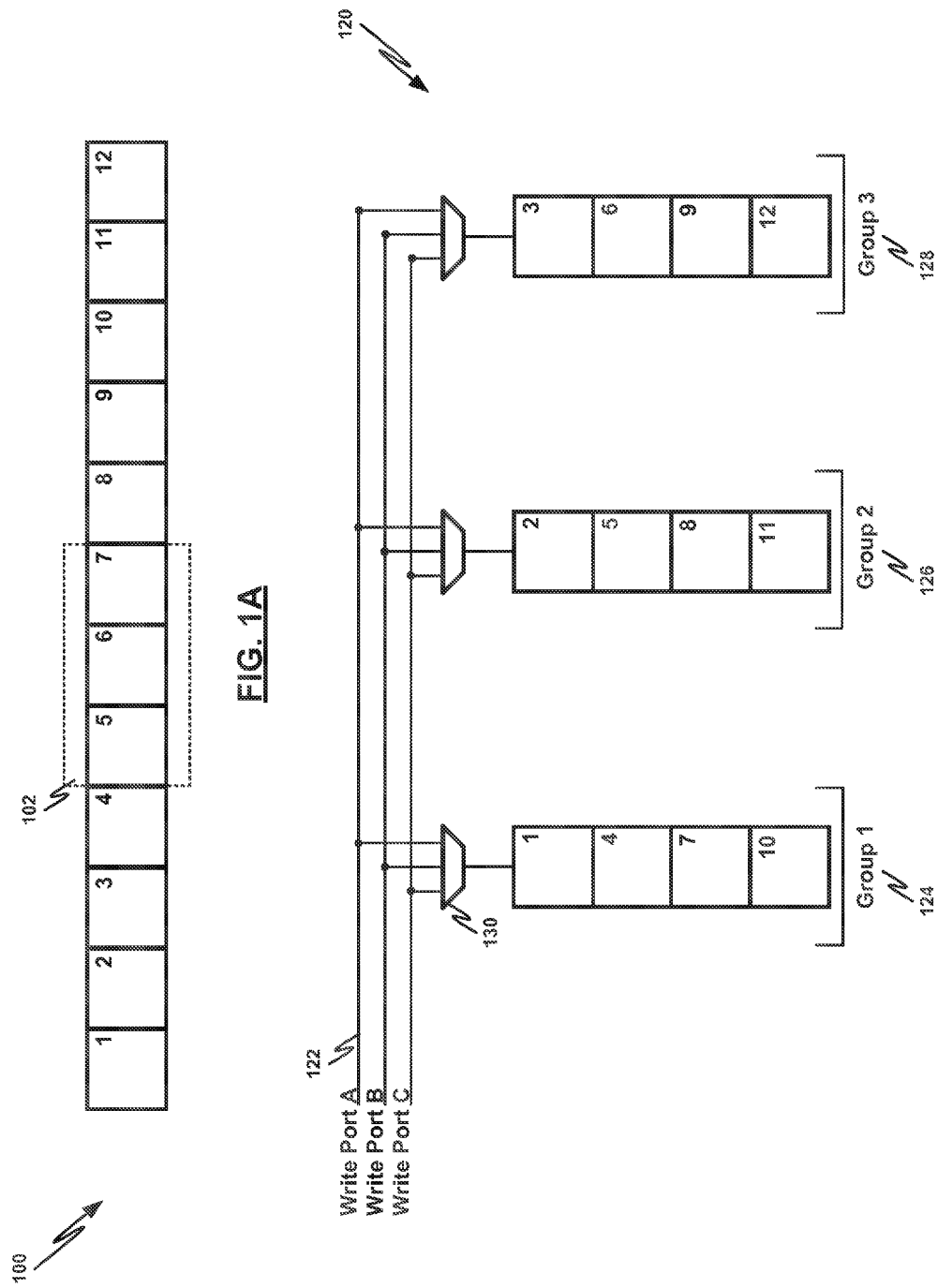

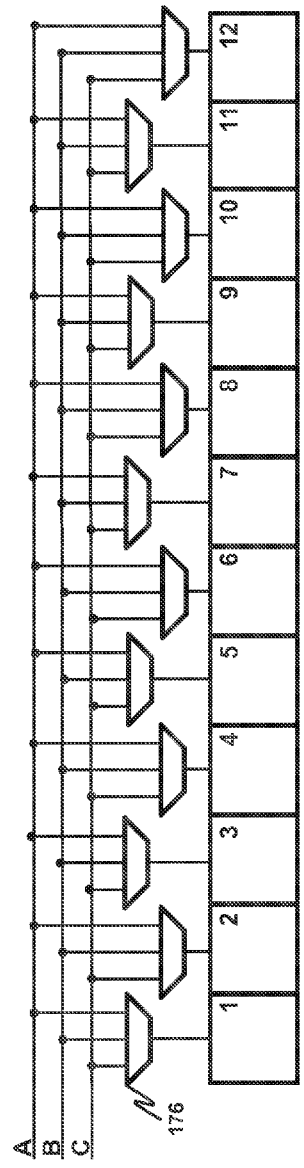

SYSTEM AND METHOD FOR WRITING DATA TO A DATA STORAGE STRUCTURE

CROSS-REFERENCE TO RELATED APPLICATIONS

This disclosure claims priority to U.S. Provisional Patent Application No. 61/738,295, filed on Dec. 17, 2012, the entirety of which is incorporated herein by reference.

TECHNICAL FIELD

The technology described in this document relates generally to digital logic design and data storage and more particularly to a system and method for writing data to a data storage structure.

BACKGROUND

Conventionally, memory devices have a single port with a plurality of input/output (I/O) pin sets. The single port is used for data exchange between a memory device and an external chipset. Such a memory device having the single port uses a parallel I/O interface to transmit and receive multi bit data through signal lines connected to the plurality of I/O pins. Multi-port memory arrays offer a higher data throughput compared to single-port memory arrays since more than one memory access may be performed simultaneously in a single clock cycle. However, multi-port memory array cells require more hardware (e.g., transistors, logic gates, multiplexers, etc.) per cell than single-port memory array cells.

In a conventional system including a multi-port memory array, when multiple elements are to be written to the array simultaneously, a multiplexer is associated with each storage location of the array. FIG. 1F depicts an example conventional system 170 for g data to an example data storage structure, where the example conventional system 170 rues one multiplexer 176 per storage location. The example of FIG. 1F illustrates that a multi-write register using the conventional system 170 allows for more flexibility in how a write is arranged than is necessary.

SUMMARY

The present disclosure is directed to systems and methods for writing data to a data storage structure. An example system for writing data to a data storage structure includes a data storage structure including an array of storage locations. The system also includes a plurality of write ports configured to write a number of elements to the array simultaneously. The array of storage locations is arranged logically into N groups. The system further includes a plurality of multiplexers, where each group of the N groups is associated with a single multiplexer of the plurality of multiplexers. The single multiplexer is configured to receive inputs from the plurality of write ports and to select a single input to be written to a storage location of the associated group.

In another example, in a system for writing data to a data storage structure, the data storage structure includes an array of storage locations. The system also includes a plurality of write ports configured to write a number of elements to the array simultaneously. The array of storage locations is arranged logically into a plurality of groups, with each group including an equal number of storage locations. No more than M storage locations of a group are accessed for writing in a clock cycle. The system further includes a plurality of multiplexers, where each group of the plurality of groups is associated with M multiplexers of the plurality of multiplexers. The M multiplexers are configured to receive inputs from the plurality of write ports and to select one or more of the inputs to be written to storage locations of the associated group.

In another example, in a method for writing data to a data storage structure that includes an array of storage locations, data to be written to the data storage structure is received via a plurality of write ports, where the plurality of write ports are configured to write a number of elements to the array simultaneously. The array of storage locations is logically arranged into N groups. Each group of the N groups is associated with a single multiplexer, and the single multiplexer is configured to receive inputs from the plurality of write ports and to select a single input to be written to a storage location of the associated group.

BRIEF DESCRIPTION OF THE FIGURES

FIG. 1A depicts an example data storage structure.

FIG. 1B depicts an example system for writing data to a data storage structure, where the example system is used to reduce a number of multiplexers necessary for performing the write operation.

FIGS. 1C, 1D, and 1E depict storage locations of the example data storage structure logically arranged into a rectangular structure with rows and columns.

FIG. 1F depicts an example conventional system for writing data to a data storage structure, where the example conventional system uses one multiplexer per storage location.

DETAILED DESCRIPTION

Figure 2:
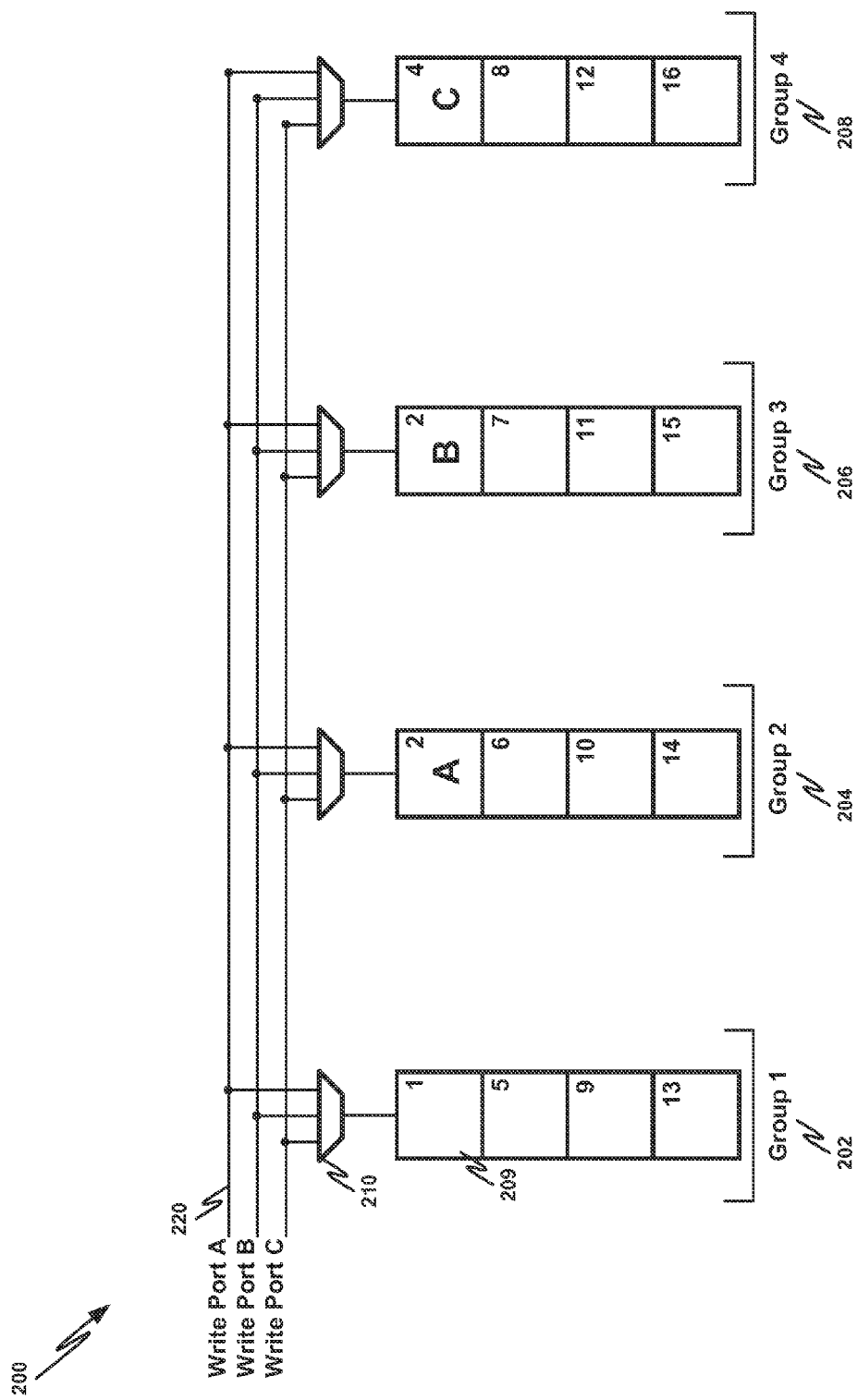
FIG. 2 depicts an example logical arrangement for a data storage array, where storage locations are logically arranged into a number of groups that is greater than a number of write ports.

FIG. 1A depicts an example data storage structure 100 including an array of storage locations. The example array of FIG. 1A includes twelve storage locations, where each storage location is logically adjacent to two other storage locations of the array. For example, as depicted at 102, the storage location labeled "6" is logically adjacent to the storage locations labeled "5" and "7." In the example linear storage structure 100, the first and last elements of the array (i.e., storage locations labeled "1" and "12," respectively) are considered to be logically adjacent. The logically adjacent storage locations are consecutive storage locations of the array. Thus, with reference again to the logically adjacent storage locations "5," "6," and "7" at 102, such a group of storage locations are consecutive storage locations of the array. The data storage structure 100 further includes hardware necessary to store and retrieve data from the array.

In the example of FIG. 1A, the data storage structure 100 is a first-in first-out (FIFO) data storage structure. In conventional systems, FIFO data storage structures have the capability to perform only a single write operation and a single read operation at a time (i.e., within a single clock cycle). However, in other systems (e.g., superscalar microprocessors), a FIFO data storage structure is capable of performing more than one write operation or more than one read operation at a time. For example, such other systems are used when it is necessary for more than one operation to be buffered per cycle and where the operations must be kept in order. The data storage structure 100 is an example FIFO data storage structure that is capable of performing more than one write operation at a time.

In the FIFO data storage structure 100, any write operations that occur simultaneously necessarily write data to consecutive storage locations. For example, if the FIFO data storage structure 100 can receive three writes in a cycle (writes A, B, and C), and it is defined that A is logically before B, and B is logically before C, then if A is written to location L, B is written to location (L+1), and C is written to location (L+2), In the example of FIG. 1A, it was noted above that logically adjacent storage locations are consecutive storage locations of the array. Thus, for example, if the three writes A, B, and C are to be performed simultaneously, and A is written to the storage location labeled "5," then B is written to the storage location labeled "6," and C is written to the storage location labeled "7."

FIG. 1B depicts an example system 120 for writing data to the example data storage structure 100, where the example system 120 is used to reduce a number of multiplexers necessary for performing the write operation. In the example system 120 of FIG. 1B, a plurality of write ports 122 (i.e., Write Port A, Write Port B, and Write Port C) are configured to write multiple elements to the array 100 simultaneously. As described above, the FIFO data storage structure 100 requires that the multiple elements be written to consecutive storage locations. To reduce the number of multiplexers in the system 120, the storage locations are arranged logically into three groups 124, 126, 128. Each of the groups 124, 126, 128 includes an equal number of storage locations (i.e., in the example of FIG. 1B, each group includes four storage locations), and each group includes nonconsecutive storage locations. The nonconsecutive storage locations included in the groups 124, 126, 12.8 are each separated in the array 100 by two storage locations. The number of groups 124, 126, 128 (i.e., three in the example of FIG. 19) is chosen to be greater than or equal to the number of elements that are simultaneously written to the array 100 (i.e., three in the example of FIG. 1B, as dictated by the three write ports 122).

As illustrated in FIG. 1B, each group of the three groups 124, 126, 128 is associated with a single multiplexer 130. The multiplexer 130 is configured to receive inputs from the write ports 122 and to select a single input to be written to a storage location of its associated group. Because the selected input is intended to be written to only a single storage location of the group, at most one storage location has an active write enable within each group. Thus, although all storage locations of a group receive the input selected by the multiplexer 130, only a single storage location of the group will sample and store the selected input. The system 120 may be implemented using a register file.

The data storage array 100 can be considered to be arranged logically into N groups 124, 126, 128, where N is greater than or equal to the number of elements that are simultaneously written to the array 100. The number of elements that are simultaneously written to the array 100 is equal to the number of write ports 122. Each group 124, 126, 128 includes nonconsecutive storage locations that are separated in the array 100 by (N-1) storage locations, such that a multiplexer 130 is shared between every Nth storage location of the array. Further, each group includes an equal number of storage locations, and thus, a number of storage locations of the array 100 is an integer multiple (K) of the number of groups (N). The logical arrangement of FIG. 19 is possible because, due to the constraints of the FIFO data storage structure 100 (i.e., values to be written simultaneously are written to consecutive storage locations), each storage location can be placed into one of the N groups 124, 126, 128, and within each group 124, 126, 128, at most one storage location is accessed for writing during a given dock cycle (i.e., two data storage locations within a single group 124, 126, 128 cannot be written to simultaneously). The system 120 is able to service all storage requests and does not deny servicing to any storage requests.

FIGS. 1C, 1D, and 1E depict the storage locations of the example data storage structure 100 logically arranged into a rectangular structure with rows and columns. In FIGS. 1C, 1D, and 1E, each of the groups 124, 126, 128 comprises a column of the rectangular structure. Each column is associated with a single multiplexer, similar to the system 120 depicted in FIG. 1B. The rectangular structure of FIGS. 1C, 1D and 1E is logical in nature, such that the data storage structure 100 does not require physical placement of the storage locations in a rectangular shape or in any particular arrangement relative to the multiplexers.

FIGS. 1C, 1D, and 1E also depict elements "A," "B," and "C" that have been simultaneously written to the data storage structure 100, As dictated by the FIFO data storage structure 100, the simultaneously written elements "A," "B," and "C" are written to consecutive storage locations (i.e., logically adjacent storage locations). In FIG. 1C, the elements are written to consecutive storage locations labeled "1," "2," and "3;" in FIG. 1D, the elements are written to consecutive storage locations labeled "5,", and "7;" and in FIG. 1E, the elements are written to consecutive storage locations labeled "9" "10," and "11." The examples of FIGS. 1C, 1D, and 1E illustrate that by defining the groups 124, 126, 128 as described above, only a single storage location within each group is written to during a given clock cycle (i.e., only a single storage location within each column is written to during a given clock cycle).

FIG. 2 depicts an example logical arrangement 200 for a data storage array, where storage locations 209 are logically arranged into a number of groups 202, 204, 206, 208 that is greater than a number of write ports 220. The example of FIG. 1B included three write ports 122, and the storage locations of the array 100 were arranged logically into three groups 124, 126, 128. As described above, in the system for reducing a number of multiplexers needed for the simultaneous write operation, a number of groups (N) is greater than or equal to a number of write ports, and each group includes an equal number of storage locations.

In the example of FIG. 2, the number of groups N is greater than the number of write ports 220. In the example logical arrangement 200, there are sixteen storage locations 209 and three write ports 220. The number of groups N cannot be equal to the number of write ports 220 because if three write groups were used, each group could not include an equal number of storage locations. Thus, the four groups 202, 204, 206, 208 are used, and each group of the groups 202, 204, 206, 208 is associated with a single multiplexer 210. When elements "A," "B," and "C" are simultaneously written to consecutive storage locations of the array, the logical arrangement of the groups 202, 204, 206, 208 ensures that no more than one storage location of any group is accessed for writing during a single clock cycle.

Figure 3:
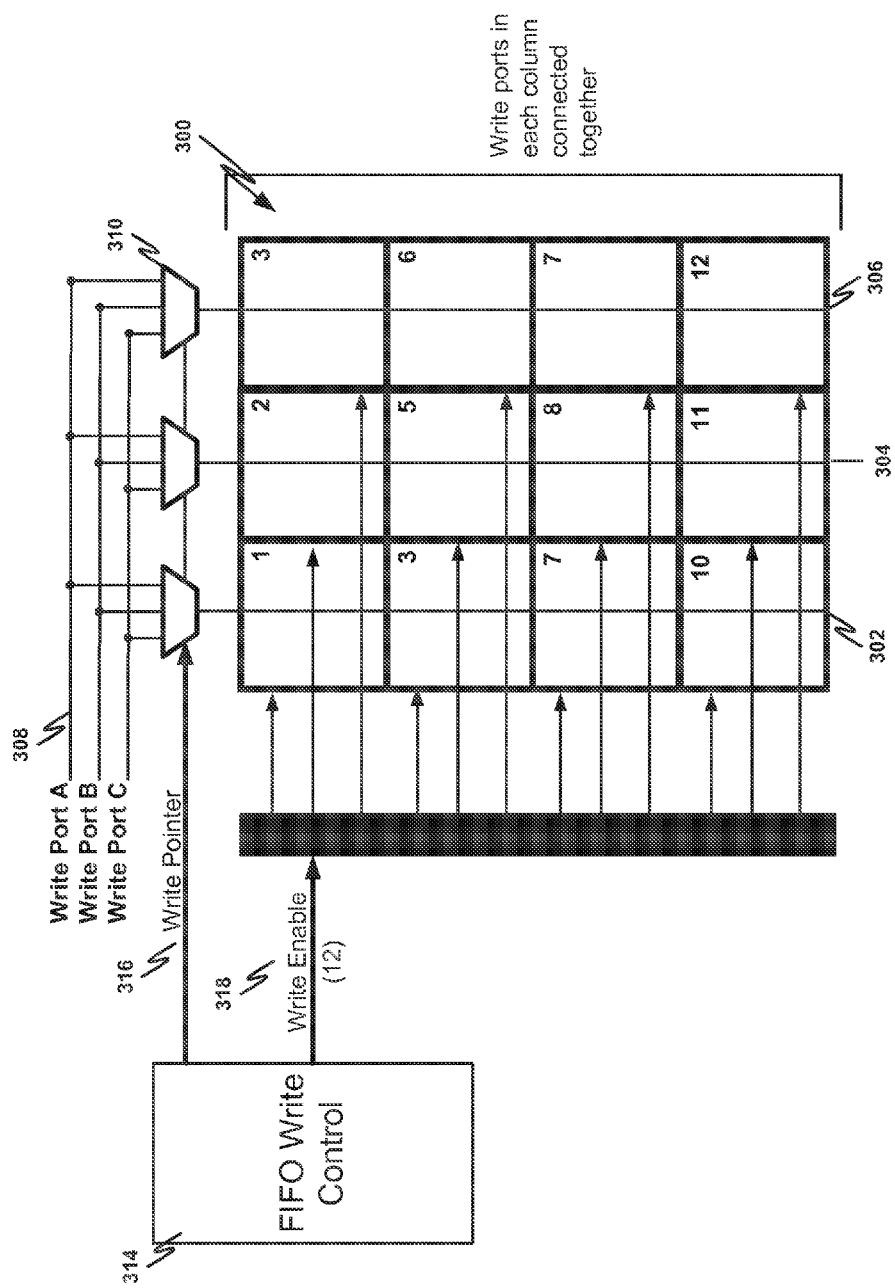
FIG. 3 depicts an example FIFO write control that provides a write pointer and a write enable signal for writing data to a data storage array.

FIG. 3 depicts an example FIFO write control 314 that provides a write pointer 316 and a write enable signal 318 for writing data to a data storage array 300. As described above, in the system for writing data to a data storage array, storage locations of the array are arranged logically into N groups 302, 304, 306, and during a single clock cycle, only a single storage location of any given group is accessed for writing. Each group 302, 304, 306 is associated with a single multiplexer 310, and the multiplexer 310 selects an input 308 to be written to the single storage location of its associated group.

In order to write to a particular storage location of a group, the FIFO write control 314 provides the write enable signal 318 to the array 300. The write enable signal 318 is a 12-bit signal that is distributed to each storage location of the array 300. The write enable signal 318 is used to activate or deactivate a write enable bit of a storage location. If the write enable bit of a storage location is active, the storage location samples and stores a received data element. If the write enable bit of a storage location is not active, the storage location does not sample and store the received data element. Because an input selected by a multiplexer 310 is intended to be written to only a single storage location of a group 302, 304, 306, at most one storage location within each group 302, 304, 306 has an active write enable bit. Thus, although all storage locations of a group 302, 304, 306 receive an input selected by a multiplexer 310, only a single storage location of the group will sample and store the selected input. As illustrated in FIG. 3, the write ports in each column of the rectangular logical arrangement are connected together.

The FIFO write control 314 also provides the write pointer 316 to the multiplexers 310. The write pointer 316 controls the multiplexers 310, thus allowing a multiplexer to select one of the inputs received from the write ports 308. The write pointer 316 is a compressed write pointer (e.g., a 3×3 matrix write pointer), as described below with reference to FIGS. 4A and 4B. Because multiple storage locations of a group share each multiplexer 310, the compressed write pointer 316 is determined based on whether any of the storage locations of the group are to be accessed for writing.

In the example of FIG. 3, a 3×3 matrix write pointer may be used for the write pointer 316. Each of the three multiplexers 3110 may be configured to read a single, particular column of the 3×3 matrix. For example, a first multiplexer of the multiplexers 310 may read a first column of the matrix, a second multiplexer of the multiplexers 310 may read a second column of the matrix, and a third multiplexer of the multiplexers 310 may read a third column of the matrix. A location of a value of "1" within the particular column may allow the multiplexer to select an input from one of the three write ports 308. For example, if a first row of the particular column has the value of "1," the multiplexer may be instructed to select an input from "Write Port A." Similarly, if a second row of the particular column has the value of "1," the multiplexer may be instructed to select an input from "Write Port B," and so on.

Figure 4A:
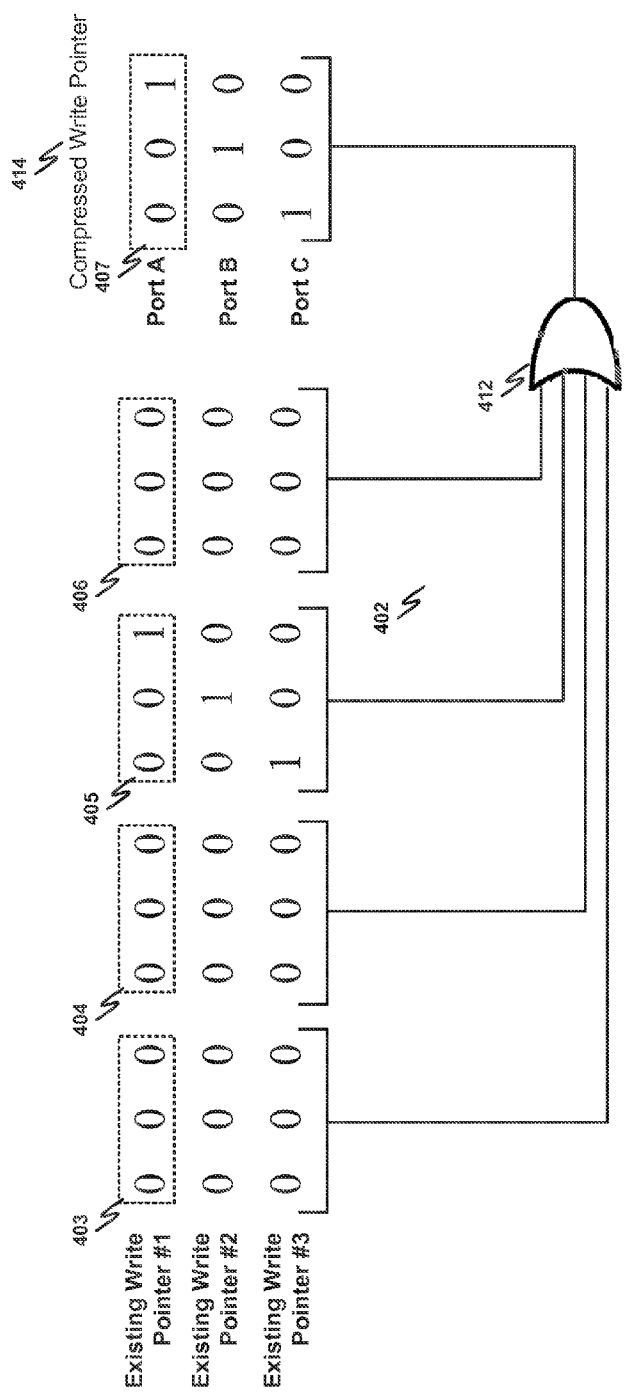
FIGS. 4A and 4B depict example methods for generating compressed write pointers to be used in controlling a multiplexer.
Figure 4B:
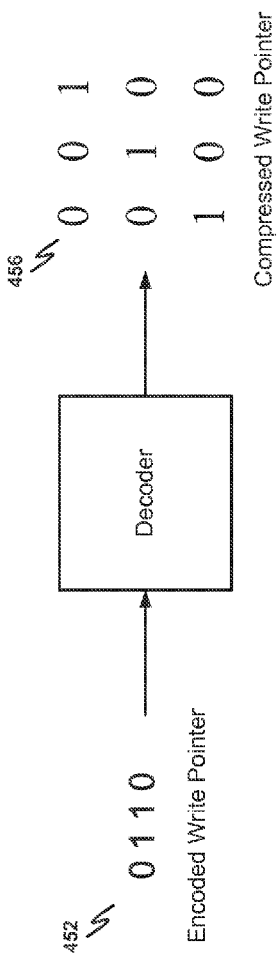

FIGS. 4A and 4B depict example methods for generating compressed write pointers 414, 456 to be used in controlling a multiplexer. As depicted in FIGS. 4A and 4B, for an example system (e.g., the example systems of FIGS. 1B and 3) including an array of twelve storage locations, three write ports, three multiplexers, and three groups of storage locations, where each group includes four nonconsecutive storage locations, the compressed write pointers 414, 456 may comprise 3×3 matrices, as described above. Such an example system can be considered to have N=3, where N is equal to the number of logically arranged groups (i.e., groups similar to groups 124, 126, 128 depicted in FIG. 1B and described above). The compressed write pointers 414, 456 control the multiplexers, thus allowing a multiplexer to select one of the inputs received from the write ports.

In FIG. 4A, to generate the compressed write pointer 414, groups of N=3 bits of existing write pointers are provided to an "OR" gate 412, and an output of the "OR" gate 412 is the compressed write pointer 414. In the example of FIG. 4A, an existing write pointer may comprise a 12 bit number that is used as a write pointer in a conventional system for writing data to a storage structure (e.g., the conventional system described above with reference to FIG. 1F). For example, in the conventional system of FIG. 1F including the twelve storage locations and the twelve multiplexers, an existing write pointer of "0 0 0 0 0 0 0 0 1 0 0 0" (i.e., "Existing Write Pointer #1," as depicted in FIG. 4A) would cause a multiplexer associated with the ninth storage location to select an input from a particular one of the three write ports. Thus, to generate a row 407 of the compressed write pointer 414, four groups 403, 404, 405, 406 of N=3 bits from the Existing Write Pointer #1 are "OR"-ed together. Other rows of the compressed write pointer 414 are generated in a similar manner.

In FIG. 4B, the decoding of an encoded write pointer 452 is modified to directly generate the compressed write pointer 456 from less significant bits of the encoded write pointer 452. In other examples, other methods for providing a compressed write pointer are used (e.g., maintaining a separate shift register or a circular counter for the compressed write pointer). In the example of FIGS. 4A and 49, both of the compressed write pointers 414, 456 are 3×3 matrices. The three multiplexers in the example of FIGS. 4A and 4B use the 3×3 matrix write pointers 414, 456 to select an input from one of the three write ports. For example, each of the three multiplexers may be configured to read a single, particular column of the 3×3 matrix, and a location of a value of "1" within the particular column may allow a multiplexer to select an input from one of the three write ports. In the example of FIGS. 4A and 49, a first multiplexer may read the first column of the compressed write pointers 414, 456, and based on the value of "1" in the third row, the first multiplexer may select an input from the Write Port C for writing. Similarly, a second multiplexer may read the second column of the compressed write pointers 414, 456 and select an input from the Write Port B, and a third multiplexer may read the third column of the compressed write pointers 414, 456 and select an input from the Write Port A.

Figure 5:
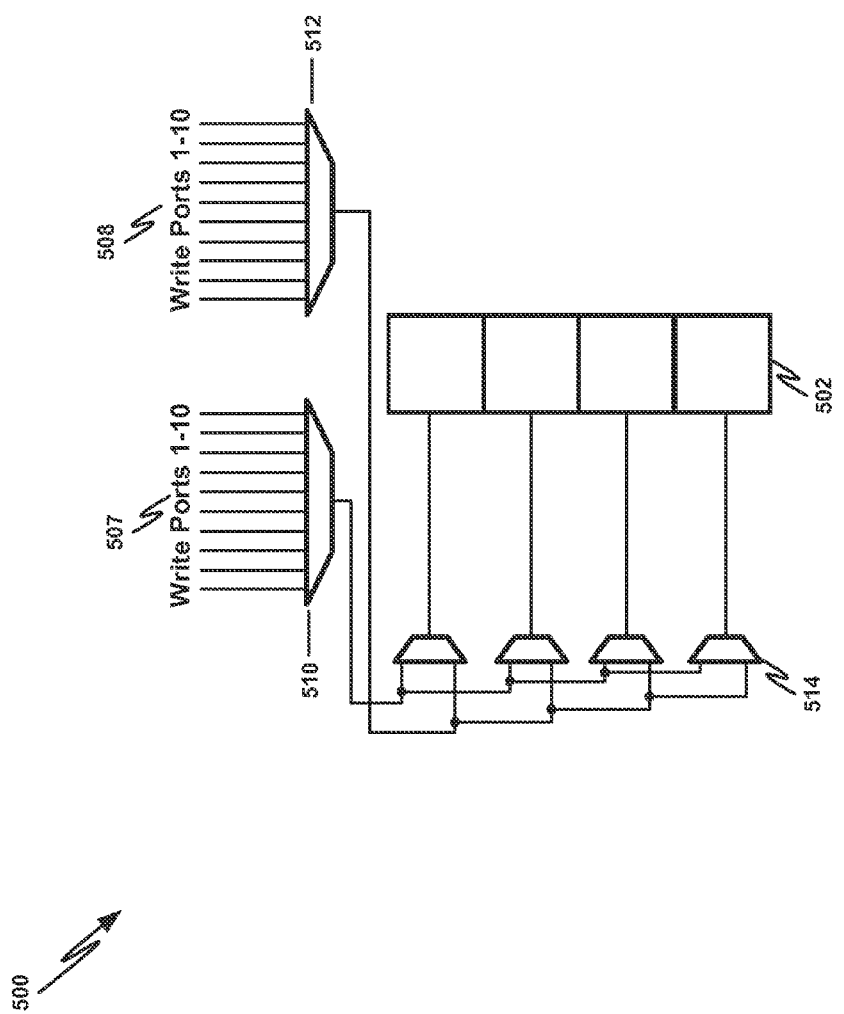
FIG. 5 depicts an example system for writing data to a data storage structure including a group of storage locations and two multiplexers that are associated with the group.

FIG. 5 depicts an example system 500 for writing data to a data storage structure including a group 502 of storage locations and two multiplexers 507, 508 that are associated with the group 502. With reference to the preceding figures, a system was described whereby storage locations of an array are arranged logically into N groups. Due to the FIFO data storage properties employed in the system, multiple elements that are simultaneously written to the array are written to consecutive storage locations, thus ensuring that for any given group, at most one storage location is accessed for writing during a single clock cycle. This property of the system allows each of the N groups to be associated with a single multiplexer.

A more generalized form of the above-described system is depicted in the example system 500 of FIG. 5. In the system 500, a plurality of ports 507, 508 are configured to write a number of elements to a data storage array simultaneously, and the storage locations of the array are logically arranged into a plurality of groups, with each group 502 including an equal number of storage locations. The system 500 varies from the above-described systems, however, because in FIG. 5, no more than M storage locations of the group 502 are accessed for writing during a single clock cycle, where M may be greater than one. Thus, in the example of FIG. 5, the value M is an integer number that represents a maximum number of storage locations of the group 502 that may be accessed for writing during a single clock cycle.

Thus, in the system 500, more than one storage location of the group 502 may be accessed for writing during a single clock cycle. In order to accommodate the simultaneous writing of multiple storage locations of the group 502 during the single clock cycle, each group 502 of the plurality of groups is associated with M multiplexers 510, 512. The M multiplexers 510, 512 are configured to receive inputs from the write ports 507, 508 and to select one or more of the inputs to be written to storage locations of the group 502. The outputs of the M multiplexers 510, 512 are received by additional multiplexers 514, where the additional multiplexers 514 select one of the received outputs to be provided to an associated storage location of the group 502. Only certain of the storage locations of the group 502 have an active write enable bit, such that certain of the storage locations will receive an output from a multiplexer 514 but will not sample and store the output.

In the example system 500 of FIG. 5, ten write ports are used, such that ten elements may be written to the data storage array simultaneously. A single group 502 of storage locations is depicted, although it is to be understood that the data storage structure includes additional storage locations that are logically arranged into similar other groups, such that each of the groups includes an equal number of storage locations. In the system 500, it can be determined that no more than two storage locations of the group 502 are accessed for writing during a single clock cycle, such that the two multiplexers 510, 512 are associated with the group 502. The multiplexers 510, 512 receive the ten inputs from the write ports 507, 508 and collectively select no more than two of the inputs to be written to storage locations of the group 502. The selected inputs are received by the additional multiplexers 514, enabling writing to certain of the storage locations of the group 502.

The system 500 of FIG. 5 need not include a FIFO data storage structure, but rather, the system 500 is used in any instance in which it can be determined that no more than M storage locations of a group are accessed for writing during a single clock cycle. Thus, generally, in instances in which a number of elements that can be simultaneously written to a group is less than a number of write ports, a number of multiplexers can be reduced by only using, for each group, a number of multiplexers equal to the number of elements that can be simultaneously written to the group.

In the example of FIG. 5, a number of elements that can be simultaneously written to the group 502 is equal to two, and this number is less than a number of write ports, which is equal to ten. Thus, the group 502 can be associated with the two multiplexers 507, 508. It is noted that although each storage location of the group 502 is further associated with an additional multiplexer 514, the additional multiplexers 514 are 2×1 multiplexers, which consume significantly less area as compared to 10×1 multiplexers. By reducing a number of 10×1 multiplexers, the system 500 of FIG. 5 reduces an area and power cost for the simultaneous writing operation.

Figure 6:
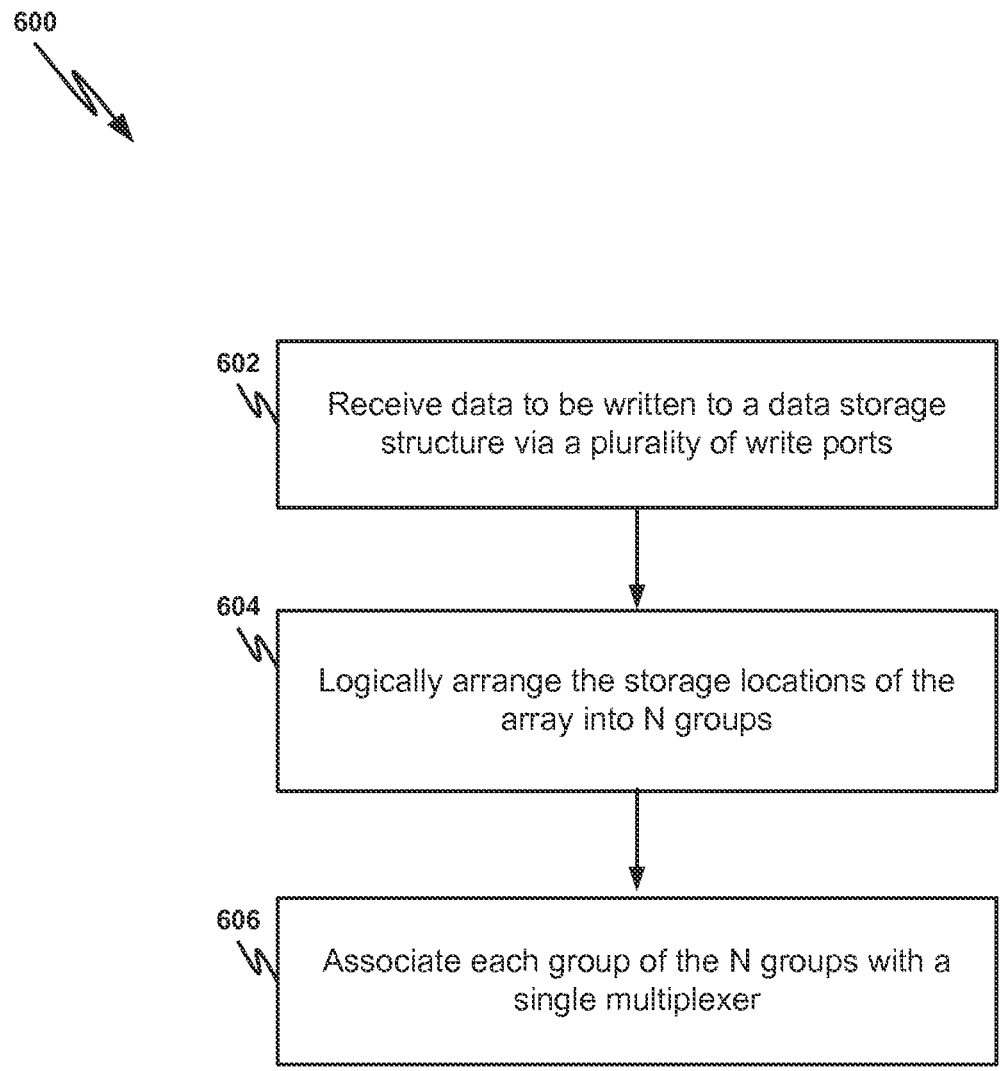
FIG. 6 is a flowchart illustrating an example method for writing data to a data storage structure.

FIG. 6 is a flowchart 600 illustrating an example method for writing data to a data storage structure that includes an array of storage locations. At 602, data to be written to the data storage structure is received via a plurality of write ports, where the plurality of write ports are configured to write a number of elements to the array simultaneously. At 604, the array of storage locations is logically arranged into N groups. At 606, each group of the N groups is associated with a single multiplexer, and the single multiplexer is configured to receive inputs from the plurality of write ports and to select a single input to be written to a storage location of the associated group.

This written description uses examples to disclose the invention, including the best mode, and also to enable a person skilled in the art to make and use the invention. It should be noted that the systems and methods described herein may be equally applicable to other frequency modulation encoding schemes. The patentable scope of the invention may include other examples.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A system for writing data to a data storage structure, the system comprising:
   a data storage structure including an array of storage locations, the storage locations being logically adjacent and consecutive;
   a plurality of write ports configured to write a number of elements to consecutive ones of the storage locations simultaneously;
   the array of storage locations arranged logically into N groups, wherein N is greater than or equal to the number of elements to be simultaneously written to the array, wherein a number of the storage locations in each group is the same for all of the N groups, and wherein the storage locations in each group are nonconsecutive and separated in the array by N−1 storage locations; and
   a plurality of multiplexers, wherein each group of the N groups is associated with a single multiplexer of the plurality of multiplexers, the single multiplexer being configured to receive inputs from the plurality of write ports and to select a single input to be written to a storage location of the associated group.

2. The system of claim 1, wherein the data storage structure is a first-in first-out (FIFO) data storage structure.

3. The system of claim 1, wherein the storage location of the associated group to which the single input is written receives a write enable signal that enables writing to the storage location, and wherein other storage locations of the associated group do not receive the write enable signal.

4. The system of claim 1, wherein the single multiplexer is associated with every Nth storage location of the array.

5. The system of claim 1, wherein the groups are logically arranged such that no more than one storage location of a group is accessed for writing in a clock cycle.

6. The system of claim 1, wherein a number of the plurality of multiplexers is less than a number of the storage locations of the array.

7. The system of claim 1, wherein an element written to the array is written to a particular storage location, and wherein each of the number of elements is written to a separate storage location of the array.

8. The system of claim 1, wherein each of the plurality of multiplexers is provided a write pointer, wherein the single input selected by the multiplexer is determined based on the write pointer, and wherein the write pointer determines which of the storage locations of a group is accessed for writing.

9. A method for writing data to a data storage structure that includes an array of storage locations, the method comprising:
   defining storage locations of the array of the data storage structure, wherein the storage locations are logically adjacent and consecutive;
   receiving data to be written to the data storage structure via a plurality of write ports, the plurality of write ports being configured to write a number of elements to consecutive ones of the storage locations simultaneously;
   logically arranging the array of storage locations into N groups, wherein N is greater than or equal to the number of elements to be simultaneously written to the array, wherein a number of the storage locations in each group is the same for all of the N groups, and wherein the storage locations in each group are nonconsecutive and separated in the array by N−1 storage locations; and
   associating each group of the N groups with a single multiplexer, the single multiplexer being configured to receive inputs from the plurality of write ports and to select a single input to be written to a storage location of the associated group.

10. The method of claim 9, further comprising:
    defining the consecutive storage locations of the data storage structure, wherein the data storage structure is a first-in first-out (FIFO) data storage structure.

11. The method of claim 9, further comprising:
    transmitting a write enable signal to the storage location of the associated group to which the single input is written, wherein the write enable signal enables writing to the storage location, and wherein other storage locations of the associated group do not receive the write enable signal.

12. The method of claim 9, wherein the associating the results in each of the single multiplexers being associated with every Nth storage location of the array.

13. The method of claim 9, wherein the logically arranging results in the groups being logically arranged such that no more than one storage location of a group is accessed for writing in a clock cycle.

14. The method of claim 9, wherein the associating results in a number of the multiplexers associated with the array being less than a number of the storage locations of the array.

15. The method of claim 9, further comprising:
    writing an element to the array at a particular storage location, wherein each of the number of elements is written to a separate storage location of the array.

16. The method of claim 9, further comprising:
    transmitting a write pointer to each of the multiplexers, wherein the single input selected by the multiplexer is determined based on the write pointer, and wherein the write pointer determines whether any of the storage locations of a group is accessed for writing.

17. The method of claim 9, wherein a physical arrangement of the storage locations is not affected by the logically arranging.

* * * * *